United States Patent [19]
Lee

[11] Patent Number: 5,797,087
[45] Date of Patent: Aug. 18, 1998

[54] METHOD AND APPARATUS FOR PERFORMING A PRESET LISTENING OPERATION FOR A RADIO BROADCAST

[75] Inventor: Hyo Chan Lee, Seoul, Rep. of Korea

[73] Assignee: Samsung Electronics Co., Ltd., Kyungki-do, Rep. of Korea

[21] Appl. No.: 633,443

[22] Filed: Apr. 17, 1996

[30] Foreign Application Priority Data

May 18, 1995 [KR] Rep. of Korea .................. 1995 12430

[51] Int. Cl.$^6$ .................................................. H04B 1/18
[52] U.S. Cl. .......................... 455/181.1; 455/171.1; 455/178.1; 455/186.1; 455/191.1
[58] Field of Search .................. 455/181.1, 186.1, 455/171.1, 178.1, 193.1, 193.2, 191.1, 132, 184.1, 187.1

[56] References Cited

U.S. PATENT DOCUMENTS

| | | | |
|---|---|---|---|
| 3,593,148 | 7/1971 | Cummings | 455/181.1 |
| 3,755,763 | 8/1973 | Hoshi | 455/178.1 |
| 3,949,303 | 4/1976 | Nishimura | 455/171.1 |
| 4,403,344 | 9/1983 | Yamada et al. | 455/181.1 |
| 4,635,121 | 1/1987 | Hoffman et al. | 455/181.1 |
| 5,101,508 | 3/1992 | Owaki | 455/181.1 |
| 5,307,513 | 4/1994 | Harada | 455/186.1 |

*Primary Examiner*—Nguyen Vo
*Attorney, Agent, or Firm*—Sughrue, Mion, Zinn, Macpeak & Seas, PLLC

[57] ABSTRACT

A method for performing a preset listening operation for a radio broadcast using a microcomputer including a first tuner, a second tuner, a random access memory and a timer. The microcomputer stores data regarding a preset channel, a preset listening start time and a preset listening end time in the random access memory. If a main power is turned on, the microcomputer tunes the first tuner to an initial channel to listen to a general broadcasting program. The microcomputer then checks whether a preset listening function has been selected. If the preset listening function has been selected, the microcomputer detects the data from the random access memory. The microcomputer identifies the present time based on an output of the timer and then determines whether the checked present time is the same as the preset listening start time. If the present time is the same as the preset listening start time, the microcomputer turns off the first tuner and tunes a second tuner to the preset channel to listen to a preset broadcasting program. The microcomputer then identifies the present time based on the output of the timer and then determines whether the checked present time is the same as the preset listening end time. If the identified present time is the same as the preset listening end time, the microcomputer turns off the second tuner and tunes the first tuner to the initial channel to listen to the general broadcasting program.

6 Claims, 4 Drawing Sheets

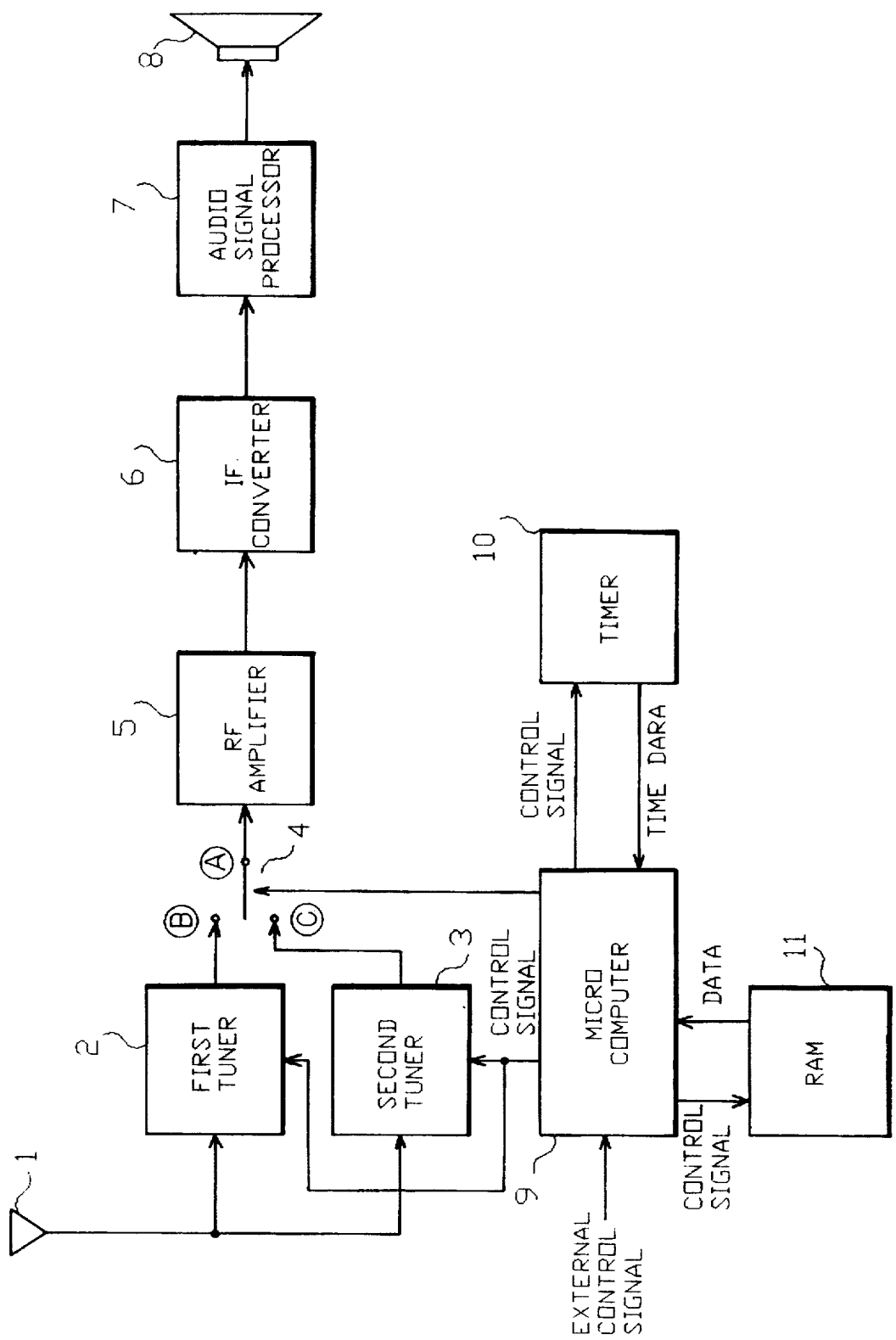

FIG. 2B
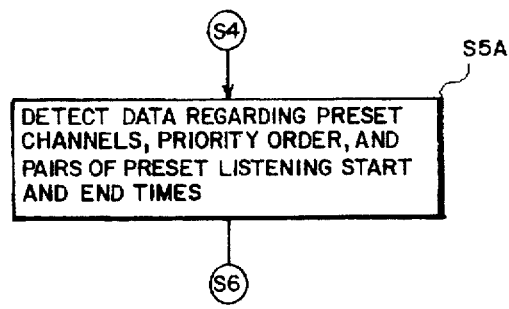
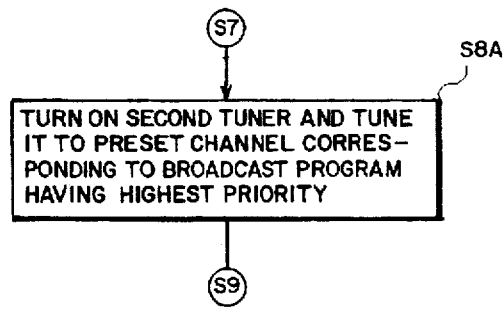

METHOD AND APPARATUS FOR PERFORMING A PRESET LISTENING OPERATION FOR A RADIO BROADCAST

BACKGROUND OF THE INVENTION

1. Field of the Invention

The present invention relates in general to a preset listening operation for a radio broadcast, and more particularly to a method and apparatus for performing a preset listening operation for a radio broadcast, in which an audio system including a radio function is automatically tuned to a preset channel at a preset time even though the audio system is not operated by the user at that time.

2. Description of the Prior Art

Generally, a user tunes an audio system including a radio function to a desired broadcast channel in order to listen to a radio broadcast of that channel. In other words, a plurality of broadcasting stations transmit their broadcasting signals at broadcasting frequencies corresponding to respective frequency channels. The transmitted broadcasting signals are received by an antenna connected to the user's audio system. In order to listen to a desired one of the received broadcasting signals, the user tunes the audio system to the corresponding frequency channel.

However, in order to listen to a regularly broadcasted program every day or hour when listening to a different program, the user must inconveniently operate a channel selector to select the corresponding frequency channel. In particular, when the user operates a car audio system to select a desired broadcasting program, his attention is distracted from driving his car. This may result in a traffic accident.

The above-mentioned problem is similarly applied in cases where the user tries to listen to a program broadcasted at a specific time of day.

SUMMARY OF THE INVENTION

The present invention has been developed in view of the above-mentioned problem, and it is an object of the present invention to provide a method and apparatus for performing a preset listening operation for a radio broadcast. For the preset listening operation, a particular channel and listening start and end times for a regularly broadcasted program are preset. According to the present invention, during the preset listening operation, an audio system is automatically tuned to the preset channel at the preset listening start time with no separate operation required on the part of the user at that time.

The above and other objects can be accomplished by providing a method and apparatus for performing a preset listening operation for a radio broadcast using a microcomputer including a first tuner, a second tuner, a random access memory (RAM), and a timer. The method according to the first embodiment comprises a first step of storing data regarding at least one preset channel, including a preset listening start time and a preset listening end time, associated with at least one preset broadcasting program corresponding to the at least one preset channel, in a random access memory; a second step of tuning a first tuner to an initial channel to listen to a general broadcasting program, if a main power is turned on; a third step of determining whether a preset listening function has been selected; a fourth step of detecting the data from the random access memory if it is determined at the third step that the preset listening function has been selected; a fifth step of identifying the present time based on an output of the timer; a sixth step of determining whether the present time identified in the fifth step is the same as the preset listening start time; a seventh step of turning off the first tuner and tuning a second tuner to the preset channel to listen to a preset broadcasting program, if it is determined at the sixth step that the present time is the same as the preset listening start time; an eighth step of identifying the present time based on the output of the timer; a ninth step of determining whether the present time identified in the eighth step is the same as the preset listening end time; and a tenth step of turning off the second tuner and tuning the first tuner to the initial channel to listen to the general broadcasting program, if it is determined at the ninth step that the checked present time is the same as the preset listening end time.

According to another aspect of the first embodiment of the invention, data is stored pertaining to a plurality of preset channels, including at least one pair of a preset listening start time and a, preset listening end time. Each pair of times is associated with at least one preset broadcasting program corresponding to at least one of the plurality of preset channels.

According to yet another aspect of the first embodiment, a user can select a preference order if there are more than one preset broadcasting program, corresponding to more than one of the plurality of preset channels, which are selected to be played at the same time. The preference order is established to ensure that a preset broadcasting program having a higher priority is played to the exclusion of a preset broadcasting program having a lower priority.

According to a second embodiment of the present invention, a method is provided for performing a preset listening operation, in which, following the step of storing described above in connection with the first embodiment of the invention, it is determined whether the preset listening function has been selected by the user prior to when power was last turned off. If the preset listening function had been selected prior to when power was last turned off, the present time is identified so that it can be determined whether the present time falls between a preset listening start time and a preset listening end time associated with at least one preset broadcasting program corresponding to the at least one preset channel. If the present time does fall between preset listening start and end times associated with at least one broadcasting program corresponding to the at least one preset channel, the second tuner is tuned to the preset broadcasting program associated with the preset listening start and end times. After the second tuner is tuned to the preset broadcasting program, the seventh step of identifying is performed. If the preset listening function was not selected prior to when power was last turned off, however, the second step of tuning is performed.

According to a third embodiment of the invention, an apparatus is provided for performing a preset listening operation. The apparatus comprises a first tuner for tuning a first received radio frequency (RF) broadcasting signal, and a second tuner for tuning a second received RF broadcasting signal. The apparatus also includes a switch for selectively transferring one of the received radio frequency broadcasting signals, an RF amplifier for amplifying one of the received RF broadcasting signals tuned by a respective one of said first and second broadcasting signals, and an intermediate frequency (IF) converter for converting an output signal of the RF amplifier into an IF signal. The apparatus further includes an audio conversion means for converting said IF signal into an audio signal and for outputting the audio signal. The switch operatively connects the second tuner to the radio frequency amplifier for a predetermined period of time when the preset listening operation has been selected by a user so that a received radio frequency broadcasting signal corresponding to a preset broadcasting program can be tuned by the second tuner.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic block diagram of an audio system for performing a preset listening operation for a radio broadcast in accordance with the present invention;

FIG. 2B depicts portions of the flowchart presented in connection with the first embodiment of the invention which are related specifically to a preference order of multiple preset broadcasting programs.

DETAILED DESCRIPTION OF THE PREFERRED EMBODIMENTS

Figure 2A:
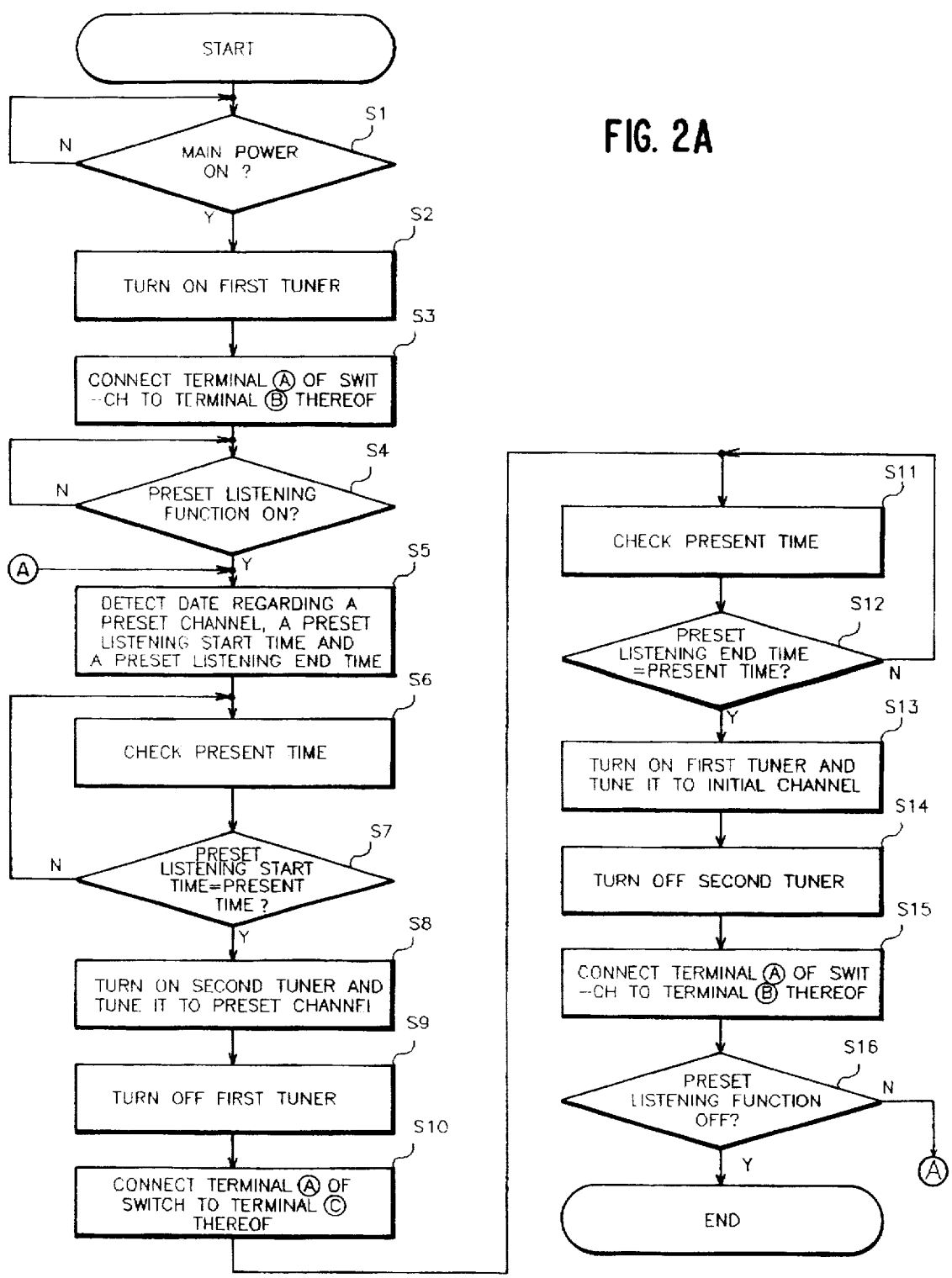
FIG. 2A is a flowchart illustrating the operation of a microcomputer in FIG. 1 according to a first embodiment of the invention.

Referring to FIG. 1, there is shown a schematic block diagram of an audio system including a radio function for performing a preset listening operation for a radio broadcast in accordance with the present invention. As shown in this drawing, the audio system comprises first and second tuners 2 and 3 for tuning radio frequency (referred to hereinafter as RF) broadcasting signals received at an antenna 1, a switch 4 for selectively transferring one of the RF broadcasting signals tuned by the first and second tuners 2 and 3, an RF amplifier 5 for amplifying the RF broadcasting signal selectively transferred by the switch 4, an intermediate frequency (referred to hereinafter as IF) converter 6 for converting an output signal from the RF amplifier 5 into an IF signal suitable for signal processing, an audio signal processor 7 for converting an output signal from the IF converter 6 into an audio signal and processing the resultant audio signal, and a speaker 8 for outputting externally the audio signal processed by the audio signal processor 7.

The audio system further comprises a microcomputer 9 for controlling ON/OFF operations of the first and second tuners 2 and 3 and a switching operation of the switch 4 in response to an external control signal, a timer 10 for indicating time, and a random access memory 11 (referred to hereinafter as RAM) for storing various data necessary to the preset listening operation, such as a preset channel, a preset broadcasting start time and a preset broadcasting end time. When the main power to the audio system is not on, the microcomputer 9 remains powered by an auxiliary power source 15.

The RAM 11 may also store a value corresponding to a preset listening operation mode in which the preset listening operation mode has a high value if a preset listening operation has been selected and a low value if a preset listening operation has not been selected. The auxiliary power source 15 can also supply power to the RAM 11 so that the value corresponding to the preset listening operation mode can be stored even when the main power is turned off. One of ordinary skill in the art will appreciate that the auxiliary power source may be a rechargeable battery.

In accordance with one embodiment of the present invention, the operation of the audio system with the above-mentioned construction will hereinafter be described in detail with reference to FIG. 2 which is a flowchart illustrating the operation of the microcomputer 9 in FIG. 1.

The microcomputer 9 checks at step S1 whether a main power of the audio system has been turned on. If it is checked at step S1 that the main power of the audio system has not been turned on, the microcomputer 9 performs the checking operation continuously until the main power of the audio system is turned on. On the contrary, if it is checked at step S1 that the main power of the audio system has been turned on, the microcomputer 9 turns on the first tuner 2 at step S2. At the same time, the microcomputer 9 outputs a control signal to the switch 4 at step S3 to connect a terminal a of the switch 4 to a terminal b thereof.

Subsequently, the RF broadcasting signals received at the antenna 1 are inputted to the first tuner 2 which tunes one of the inputted RF broadcasting signals corresponding to a frequency channel selected by the user. The tuned RF broadcasting signal from the first tuner 2 is supplied to the RF amplifier 5 through the terminals b and a of the switch 4. The RF amplifier 5 amplifies the RF broadcasting signal tuned by the first tuner 2 to a processible level and supplies the amplified RF broadcasting signal to the IF converter 6. The IF converter 6 converts the amplified RF broadcasting signal from the RF amplifier 5 into an IF signal and supplies the resultant IF signal to the audio signal processor 7. The audio signal processor 7 converts the IF signal from the IF converter 6 into an audio signal and outputs the resultant audio signal externally through the speaker 8. As a result, the user can listen to the desired broadcast.

Thereafter, the microcomputer 9 checks, at step S4, whether a preset listening function has been selected by the user. If it is checked at step S4 that the preset listening function has not been selected by the user, the microcomputer 9 performs the checking operation continuously until the preset listening function is selected by the user.

On the contrary, if it is checked at step S4 that the preset listening function has been selected by the user, the microcomputer 9 outputs a control signal to the RAM 11 at step S5 to detect therefrom information regarding at least one preset channel, including a preset listening start time and a preset listening end time associated with at least one broadcast program corresponding to the at least one preset channel, selected by the user.

The microcomputer 9 also outputs a control signal to the timer 10 at step S6 to check the present time therefrom. At step S7, the microcomputer 9 compares the checked present time with the preset listening start time detected at step S5 to check whether the present time is the same as the preset listening start time. If it is checked at step S7 that the present time is not the same as the preset listening start time, the microcomputer 9 returns to step S6 to check the present time from the timer 10. Subsequently, the microcomputer 9 performs the checking operation continuously until the present time becomes the same as the preset listening start time.

On the contrary, in the case where it is checked at step S7 that the present time is the same as the preset listening start time, the microcomputer 9 outputs a control signal to the second tuner 3 at step S8 to turn the second tuner 3 on. Then at step S8, the microcomputer 9 tunes the second tuner 3 to the preset channel detected at step S5, so that the second tuner 3 can enter a standby state for receiving a broadcasting signal of the preset channel.

The microcomputer 9 outputs a control signal to the first tuner 2 at step S9 to turn it off. Also, the microcomputer 9 outputs a control signal to the switch 4 at step S10 to connect the terminal a of the switch 4 to a terminal c thereof. As a result, the preset broadcasting signal tuned by the second tuner 3 is applied to the RF amplifier 5 through the terminals a and c of the switch 4. Then, the tuned broadcasting signal is converted into the audio signal and outputted through the speaker 8, in a similar manner to that mentioned above. Therefore, the user can listen to the preset broadcast at the corresponding broadcasting time with no separate operation required by the user at that time.

On the other hand, the microcomputer 9 outputs a control signal to the timer 10 at step S11 to check the present time therefrom. At step S12, the microcomputer 9 compares the checked present time with the preset listening end time detected at step S5 to check whether the present time is the same as the preset listening end time. If it is checked at step S12 that the present time is not the same as the preset listening end time, the microcomputer 9 returns to step S11 to check the present time from the timer 10. Subsequently, the microcomputer 9 performs the checking operation continuously until the present time becomes the same as the preset listening end time.

In the case where it is checked at step S12 that the present time is the same as the preset listening end time, the microcomputer 9 outputs a control signal to the first tuner 2 at step S13 to turn the first tuner 2 on. Then at step S13, the microcomputer 9 tunes the first tuner 2 to the initial channel set before the preset listening function is performed.

The microcomputer 9 also outputs a control signal to the second tuner 3 at step S14 to turn it off. In addition, the microcomputer 9 outputs a control signal to the switch 4 at step S15 to connect the terminal a of the switch 4 to the terminal b thereof. As a result, the broadcasting signal tuned by the first tuner 2 is applied to the RF amplifier 5 through the terminals a and b of the switch 4. Subsequently, the tuned broadcasting signal is converted into an audio signal and outputted through the speaker 8, in a manner similar to that mentioned above. Thus, the user can listen to the initial broadcast again with no separate operation.

Thereafter, the microcomputer 9 checks at step S16 whether the preset listening function has been turned off. If it is checked at step S16 that the preset listening function has not been turned off, the microcomputer 9 returns to step S5 to repeat step S5 and the subsequent steps. On the contrary, if it is checked at step S16 that the preset listening function has been turned off, the microcomputer 9 ends the entire process.

According to another aspect of the first embodiment described above, data is stored in the RAM 11 corresponding to more than one preset channel. The data stored in the RAM 11 includes at least one pair of preset listening start and end times associated with at least one preset broadcasting program corresponding to at least one of the preset channels.

According to yet another aspect of the first embodiment described above, a user can enter a preference order into the microcomputer 9 if there is more than one broadcast program corresponding to more than one of the preset channels. The preference order is stored in RAM 11 along with other data related to the preset listening operation. The preference order is established to ensure that a broadcast program having a higher preference is tuned to the exclusion of a broadcasting program having a lower priority.

FIG. 2B shows modified versions of steps 5 and 8, described above in connection with the first embodiment of the invention shown in FIG. 2A, which are depicted as steps 5A and 8A. In step 5A, the microprocessor outputs a control signal to the RAM 11 to detect therefrom information regarding multiple preset channels, including pairs of preset listening start and end times associated with at least one preset broadcasting program corresponding to at least one of the multiple preset channels. In step 8A, the microcomputer 9 tunes the second tuner 3 to the preset channel detected at step S5A corresponding to the preset broadcasting program having the highest priority if more than one preset broadcast program are selected to be played concurrently. In this respect, only the preset broadcast program having the highest priority is played. One of ordinary skill in the art, however, will appreciate that the present invention could be readily modified so that the user is able to override the priority order which has been previously established.

According to a second embodiment of the invention, a method is provided which is similar to the method described above in connection with the first embodiment of the invention. However, the method according to the second embodiment differs from the method according to the first embodiment as follows.

Figure 2C:
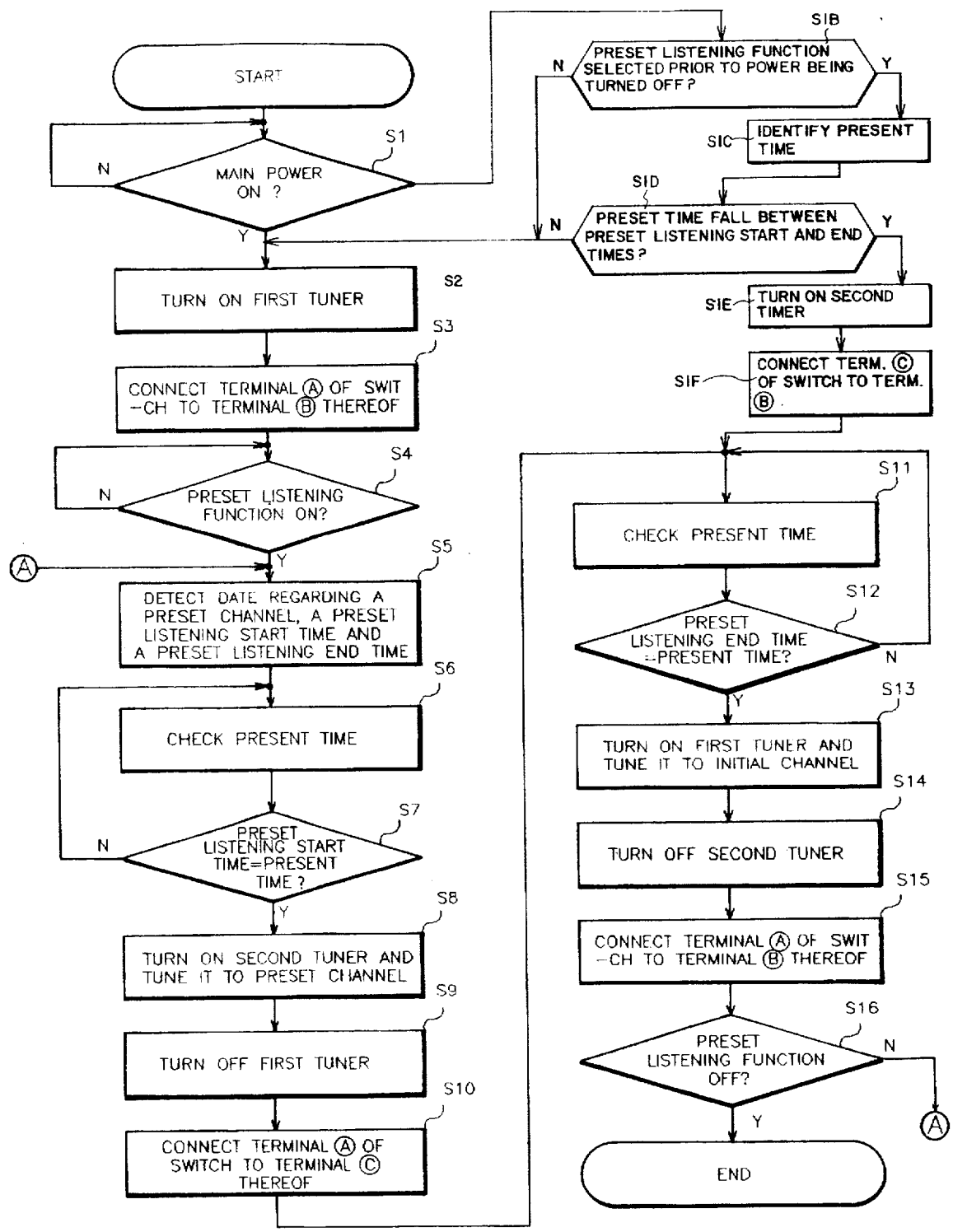
FIG. 2C is a flowchart illustrating the operation of a microcomputer in FIG. 1 according to a second embodiment of the invention.

In FIG. 2C additional steps S1A–S1F are shown. After the main power is checked in step S1A, as per step S1 described above, the microprocessor 9 determines in step S1B whether a preset listening operation was selected prior to the main power being turned off. The microcomputer 9 accomplishes this step by checking a value corresponding to the preset listening operation mode stored in the RAM 11 which remains powered via the auxiliary power source 15 when the main power is turned off. If the value corresponding to the preset listening operation mode is low, the preset listening function was not selected prior to the main power being turned off and step S2 is performed as described above in connection with the first embodiment of the invention.

If the value corresponding to the preset listening operation mode is high, the preset listening function was selected prior to the main power being turned off and step S1C is performed. In step S1C, the microcomputer 9 outputs a control signal to the timer 10 to identify the present time therefrom. Subsequently, during step S1D, the microcomputer 9 determines, in accordance with data stored in the RAM 11, whether the identified present time falls between preset listening start and end times associated with at least one preset broadcasting program corresponding to at least one preset channel.

If the microcomputer 9 determines that the present time does not fall between the preset listening start and end times, step S2 is performed as described above in connection with the first embodiment of the invention. If, however, the microcomputer 9 determines that the present time does fall between the preset listening start and end times, step S1E is performed. In step S1E, the microcomputer 9 turns on the second tuner 3. At the same time, in step S1F, the microcomputer 9 outputs a control signal to the switch 4 in order to connect terminal C of the switch 4 to terminal B of the same. Following step S1F, step S11 is performed as described above in connection with the first embodiment of the invention.

Noticeably, the preset listening function may be performed at a fixed time every day or at a fixed minute every hour. To this end, the preset listening function must be accompanied with a separate function for selecting "every day" or "every hour". In the case where "every day" is selected, the preset listening function is performed at a set time regardless of the day. In the case where "every hour" is selected, the preset listening function is performed at a set minute regardless of the hour.

As apparent from the above description, according to the present invention, when the present time reaches the listening start time preset by the user, the corresponding broadcasting channel is automatically tuned by the tuner. For this reason, it is not necessary to manually tune the audio system to the broadcasting channels. This provides the user with convenience. In particular, the user need not operate a car audio system to select a desired broadcasting program which is regularly broadcasted. Therefore, the user's attention will not be distracted from driving his car so that the probability of a traffic accident occurring is reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing a preset listening operation for at least one radio broadcast in an audio system having a microcomputer for controlling a first tuner, a second tuner, a random access memory (RAM), and a timer, the method comprising the steps of:

(a) storing data regarding at least one preset channel, including a preset listening start time and a preset listening end time associated with at least one preset broadcast program corresponding to said at least one preset channel, in said random access memory;

(b) tuning said first tuner to an initial channel to listen to a general broadcasting program, if a main power is turned on;

(c) determining whether a preset listening function has been selected;

(d) detecting said data from said random access memory if it is determined at said step (c) that the preset listening function has been selected;

(e) identifying a present time based on an output of said timer;

(f) determining whether said present time identified in step (e) is the same as said preset listening start time;

(g) turning off said first tuner, tuning said second tuner to said preset channel and outputting an audible signal which corresponds to said at least one preset broadcasting program of said preset channel, if it is determined at said step (f) that the present time is the same as said preset listening start time;

(h) identifying the present time based on said output of said timer;

(i) determining whether said present time checked in step (h) is the same as said preset listening end time; and (j) turning off said second tuner, tuning said first tuner to said initial channel and outputting an audible signal which corresponds to said general broadcasting program of said initial channel, if it is determined at step (i) that the present time identified in step (h) is the same as said preset listening end time.

2. The method defined in claim 1, wherein in the storing step (a), data is stored pertaining to a plurality of preset channels, including at least one pair of a preset listening start time and a preset listening end time, said at least one pair of preset listening start and end times being associated with at least one preset broadcasting program corresponding to at least one of the plurality of preset channels.

3. The method defined in claim 2, further comprising the step of establishing a preference order if there are more than one preset broadcasting program, corresponding to more than one of said plurality of preset channels, which are selected to be played at the same time, said preference order being established to ensure that a preset broadcasting program having a higher priority is played to the exclusion of a preset broadcasting program having a lower preference.

4. A method for performing a preset listening operation for at least one radio broadcast in an audio system having a microcomputer for controlling a first tuner, a second tuner, a random access memory (RAM), and a timer, the method comprising the steps of:

(a) storing data regarding at least one preset channel, including a preset listening start time and a preset listening end time associated with at least one preset broadcast program corresponding to said at least one preset channel, in said random access memory;

(b) tuning said first tuner to an initial channel to listen to a general broadcasting program, if a main power is turned on;

(c) determining whether a preset listening function has been selected;

(d) detecting said data from said random access memory if it is determined at said step (c) that the preset listening function has been selected;

(e) identifying a present time based on an output of said timer;

(f) determining whether said present time identified in step (e) is the same as said preset listening start time;

(g) turning off said first tuner and tuning said second tuner to said preset channel to listen to said at least one preset broadcasting program, if it is determined at said step (f) that the present time is the same as said preset listening start time;

(h) identifying the present time based on said output of said timer;

(i) determining whether said present time checked in step (h) is the same as said preset listening end time; and (j) turning off said second tuner and tuning said first tuner to said initial channel and outputting an audible signal which corresponds to said general broadcasting program, if it is determined at step (i) that the present time identified in step (h) is the same as said preset listening end time;

(k) determining whether the preset listening function has been selected by the user prior to when power was last turned off;

(l) tuning said first tuner, as in step (b), if it is determined in step (k) that preset listening function was not selected by the user prior to when power was last turned off;

(m) identifying the present time based on the output of said timer, if it is determined in said (k) step that said preset listening function had been selected prior to when said power was last turned off;

(n) determining whether the present time identified in step (l) falls between said preset listening start time and said preset listening end time associated with said at least one preset broadcast program corresponding to said at least one preset channel;

(o) tuning the second tuner to said preset broadcasting program associated with said preset listening start and end times if it is determined in step (n) that said present time falls between said preset listening start time and said preset listening end time; and (p) tuning said first tuner, as in step (b), if it is determined in step (n) that said present time, identified in step (m), does not fall between said preset listening start and end times;

wherein said step (k) is performed prior to said step (b).

5. An apparatus for performing a preset listening operation comprising:

a first tuner for tuning a first received radio frequency (RF) broadcast signal;

a second tuner for tuning a second received RF broadcast signal corresponding to a user selected preset broadcast program;

a switch for selectively transferring one of said first and second received RF broadcast signals;

an RF amplifier for amplifying one of said first and second received RF broadcast signals tuned by a respective one of said first and second tuners and transferred by said switch;

an intermediate frequency (IF) converter for converting an output signal of the RF amplifier into an IF signal;

an audio conversion means for converting said IF signal into an audio signal and for outputting said audio signal;

a random access memory (RAM) for storing data regarding at least one preset channel, including a preset listening start time and a preset listening end time associated with at least one preset broadcast program corresponding to said at least one preset channel; and a microcomputer for controlling said first tuner, said second tuner, and said switch in order to perform said preset listening operation, said microcomputer identifying a present time and determining whether the present time is the same as said listening start or end time when said preset listening operation is selected;

wherein when said preset listening operation is selected, said microcomputer turns off the first tuner and tunes the second tuner to said preset channel if it is determined that the present time is the same as said preset listening start time, and subsequently said microcomputer turns off the second tuner and tunes the first tuner to an initial channel if it is determined that the present time is the same as said preset listening end time.

6. The apparatus defined in claim 5, further comprising an auxiliary power source for powering said microcomputer and said random access memory.

* * * * *